June 24, 1969

R. G. WIEGERT ET AL 3,451,267

CALORIMETER

Filed Feb. 7, 1966

INVENTORS.
Richard G. Wiegert
James R. Gentry
Newton, Hopkins,
Jones & Ormsby
BY:
ATTORNEYS

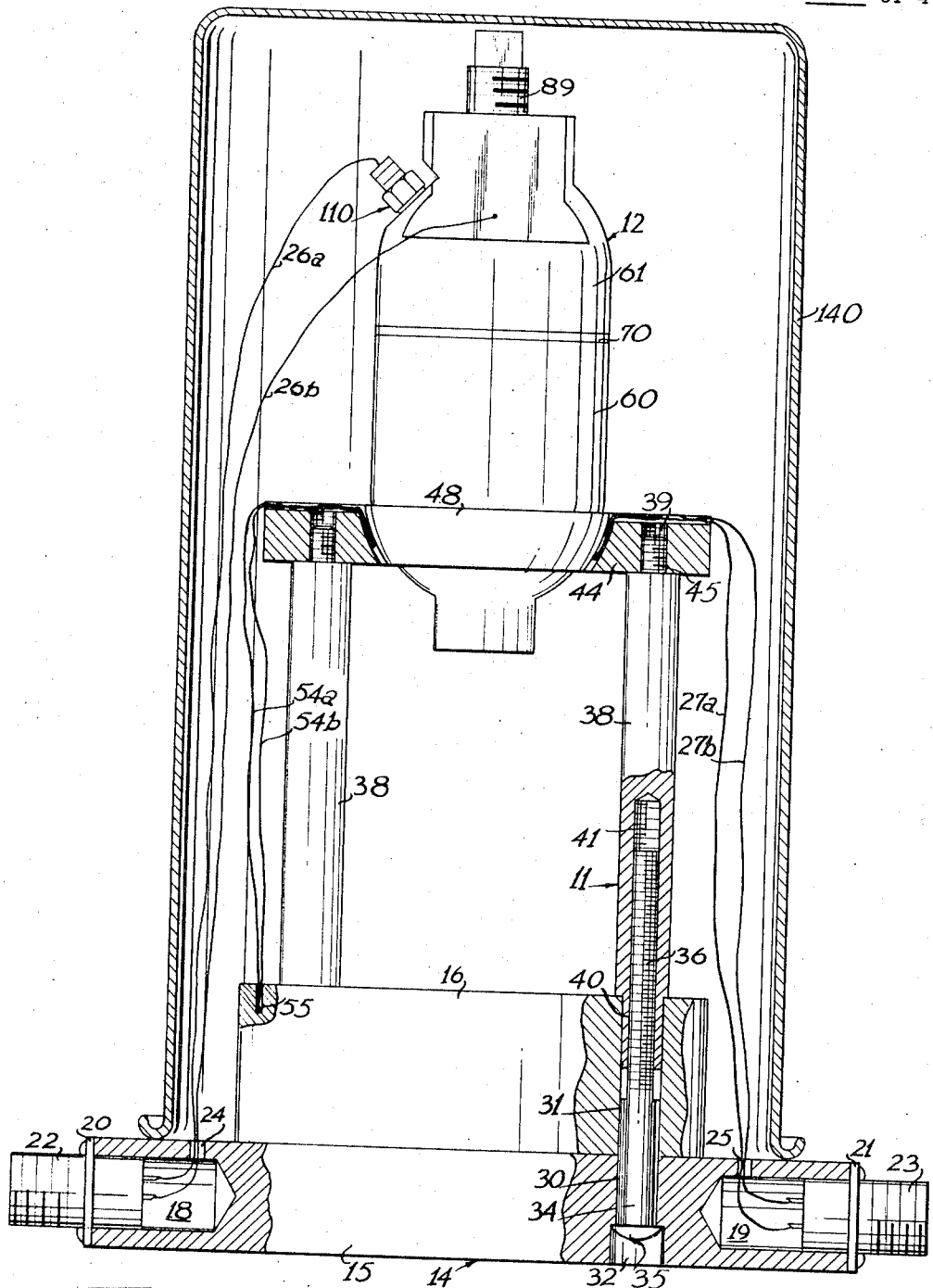

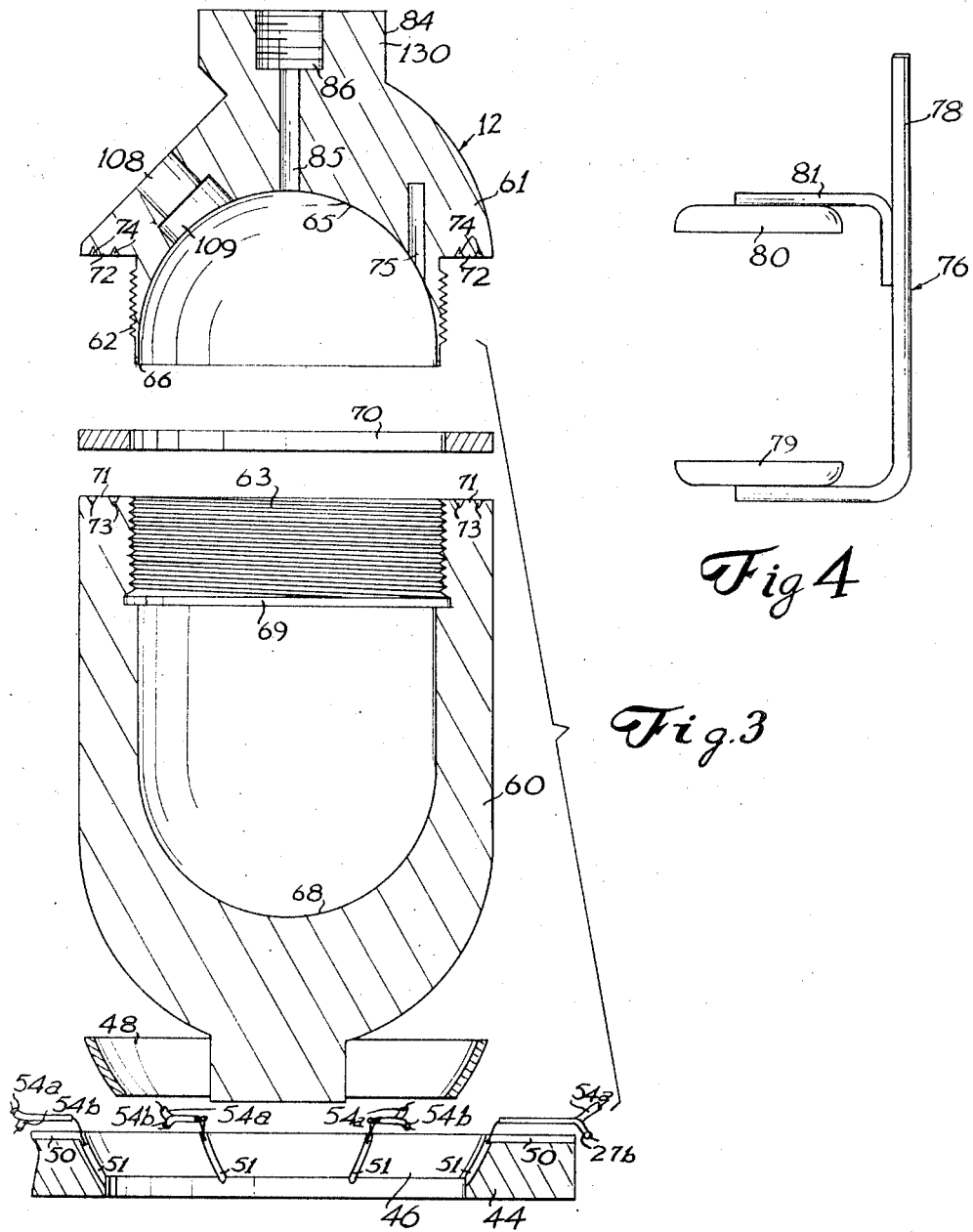

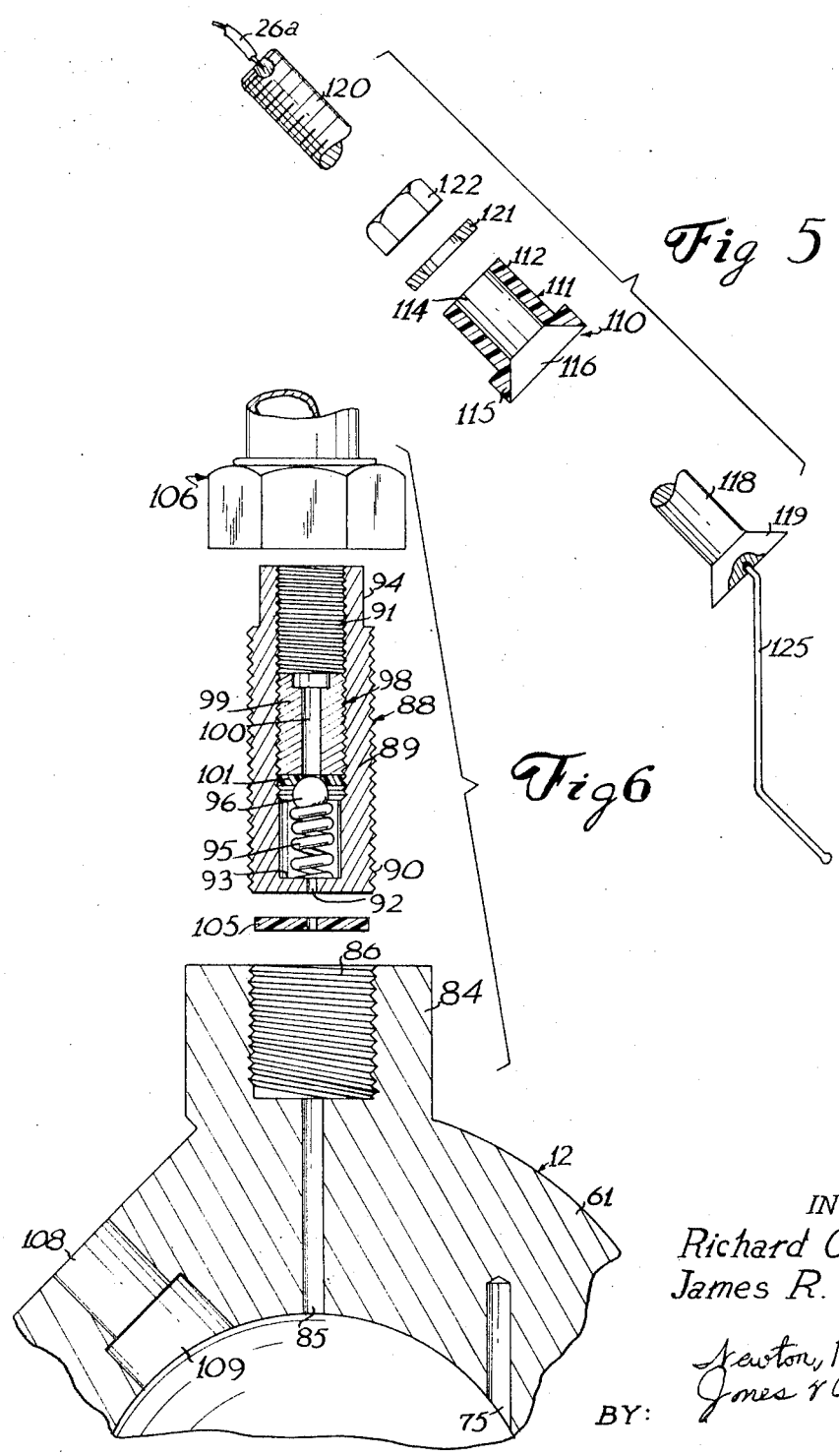

United States Patent Office 3,451,267
Patented June 24, 1969

3,451,267
CALORIMETER
Richard G. Wiegert, 410 Seminola St., and James R. Gentry, 313 Silver Bluff Road, both of Aiken, S.C. 29801
Filed Feb. 7, 1966, Ser. No. 525,462
Int. Cl. G01k *17/00*
U.S. Cl. 73—191                            4 Claims

ABSTRACT OF THE DISCLOSURE

The present invention relates to a calorimeter which is a device for measuring the heat energy released from various compositions upon ignition. The device includes (1) a bomb member for housing the compositions to be analyzed and having means therein for producing ignition and introducing oxygen for supporting combustion; (2) a support means for mounting said bomb within a heat retaining shield; and (3) heat sensing means in the form of a plurality of thermocouples in contact with said bomb for measuring the amount of heat energy released during combustion. The apparatus and method utilized in the present invention employs the introduction and presence of oxygen within the bomb at 30 atmospheres, which is approximately 4,350 p.s.i.g.

---

This invention relates to a calorimeter for measuring the heat emitted from a burning substance, and is more particularly related to a miniature bomb calorimeter for measuring the heat emitted from small biological samples ranging in weight from one to twenty milligrams dry weight.

In the past, ecologists have developed apparatus for measuring heat emission from various substances to determine the calorific value of such substances. In order to make such determinations, extremely accurate control and measurement must be maintained over the apparatus utilized in burning the substance and measuring the heat emission from the substance. Usually, the greater the amount of substance burned, the greater the accuracy of the test. Thus, the previously known calorimeters have usually required at least two-hundred milligrams dry weight of material for each combustion before reliable results were obtained. The requirement for such a large quantity of material to obtain reliable results in heat measurements makes such measurements quite expensive when certain expensive or rare compounds are tested.

Accordingly, this invention comprises a calorimeter including a bomb formed in two portions that are removably secured to each other and that define a small enclosure, one of the portions of the calorimeter bomb housing an electrode and a check valve through which a pressurizing fluid can be injected, the calorimeter bomb supporting a small platform within its enclosure for the receipt of the substance to be tested, and a stand for supporting the bomb, the stand including heat detecting means for detecting the heat generated by the bomb.

Thus, it is an object of this invention to provide apparatus for measuring the heat emitted from the combustion of substances ranging in weight from one to twenty milligrams dry weight.

Another object of this invention is to provide a calorimeter for measuring the heat emitted from the combustion of small amounts of substances with a high degree of accuracy.

Another object of this invention is to provide apparatus for measuring the heat emitted from a small substance and its surrounding enclosure at several points disposed about the surrounding enclosure.

Another object of this invention is to provide a method and apparatus for accurately, conveniently, and economically measuring the heat emitted from the combustion of a small quantity of substances.

Other objects, features and advantages of the present invention will become apparent upon reading the following specification, taken in conjunction with the accompanying drawing, in which:

FIG. 2 is an elevational view of the calorimeter with parts broken away;

FIG. 3 is an exploded elevational view of the calorimeter bomb and the upper portion of its stand;

FIG. 4 is an elevational view of the platform of the calorimeter bomb;

FIG. 5 is an exploded cross-sectional view of the calorimeter bomb electrode;

FIG. 6 is an exploded cross-sectional view of the calorimeter bomb check valve;

Figure 1:
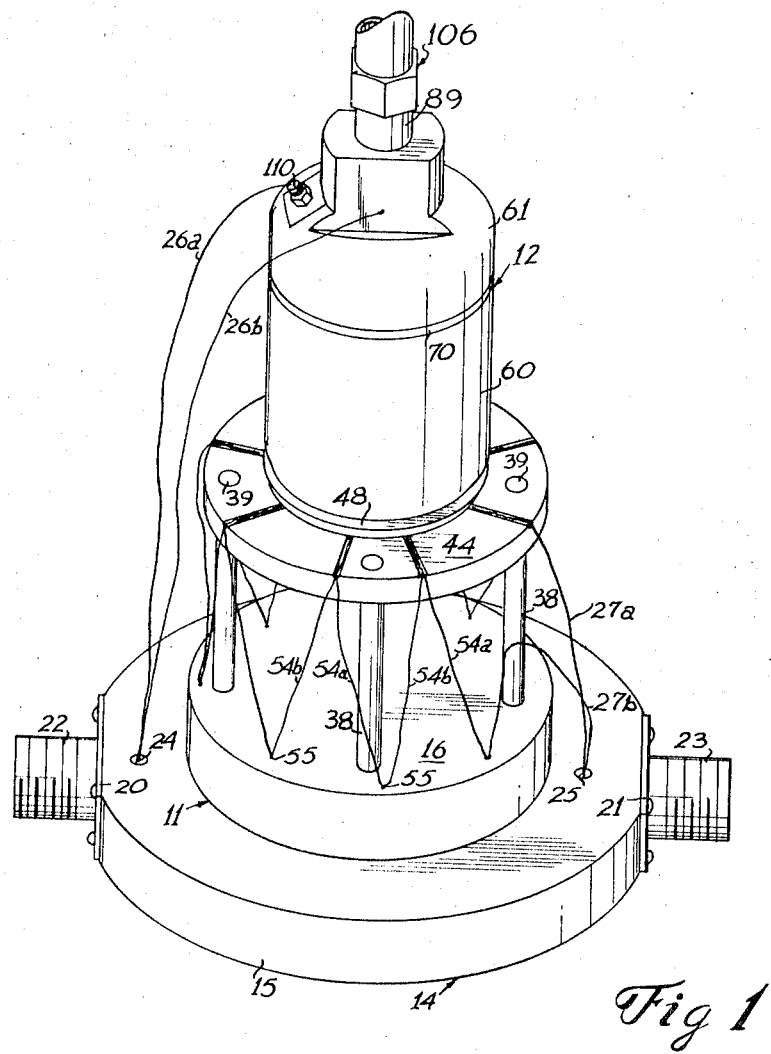
FIG. 1 is the perspective view of the calorimeter, showing the bomb and stand with the insulating cover removed.

Referring now more particularly to the drawing, in which like numerals indicate like parts throughout the several views, FIG. 1 shows the calorimeter 10 which includes stand 11 and bomb 12. The stand 11 comprises a base 14 which includes an enlarged support portion 15 and a smaller platform portion 16. The base 14 is circular in cross-section and its support portion 15 defines receptacles 18 and 19 for the receipt of electrical connections. The receptacles 18 and 19 are closed by cover plates 20 and 21 and have electrical connectors 22 and 23 extending through the cover plates 20 and 21, respectively. Apertures 24 and 25 communicate between the receptacles 18 and 19 and the upper surface of the support portion 15 of the base 14 of the stand 11. Nylon insulated wires 26a and 26b are connected to the electrical connector 22 and extend through the receptacle 18 and its aperture 24 while the nylon insulated wires 27a and 27b are connected to the electrical connector 23 and extend through the receptacle 19 and its aperture 25.

The support portion 15 and the platform portion 16 of the base 14 are constructed with aligned apertures 30 and 31, respectively, and the apertures 30 are countersunk to form enlarged aperture areas 32. Connecting rods 34 are inserted through the apertures 30 and 31, the connecting rods having enlarged heads 35 bottoming in the enlarged aperture areas 32 of the support portions 15 of the base 14. The connecting rods 34 each have reduced diameter portions 36 on their ends remote from the ends having the heads 35. The reduced diameter portions 36 are threaded and stanchions 38 are threaded thereon. The stanchions 38 comprise reduced diameter, exteriorly threaded portions 39 at one end, reduced diameter portions 40 at their other ends, and are interiorly threaded at 41 at their ends opposite to the exteriorly threaded portions. The reduced diameter portions 40 of the stanchions 38 are of a diameter approximately equal to the diameter of the apertures 31 of the platform portion 16 so that they can be inserted into apertures 31. The internally threaded portions 41 of the stanchions 38 threadedly receive the reduced diameter portions 36 of the connecting rods 34, and the connecting rods are screwed into the stanchions until the reduced diameter portions 40 of the stanchions are entirely received within the apertures 31 of the platform portion 16. Thus, the stanchions 38 are rigidly secured to the base 14, and the support portion 15 and the platform 16 are rigidly connected to each other.

An annular support ring 44 is supported by the stanchions 38 by means of the externally threaded portions 39 of the stanchions 38 being threaded into the threaded apertures 45 of the support ring 44.

The support ring 44 is constructed with an arcuate inner annular support surface 46 which supports a similarly shaped heat conducting ring 48. The support ring 44 has a plurality of grooves 50 and 51 extending across its upper surface and its arcuate inner annular support surface, respectively. The grooves 51 extend beneath the heat conducting ring 48.

As is best shown in FIG. 1, the nylon insulated copper electrical wires 27a and 27b lead from the receptacle 19 through its aperture 25 toward the support ring 44, the wire 27a being received in the pair of grooves 50 and 51 while wire 27b is received in one of the base holes 55. Nylon insulated constantan wire 54a is inserted into the same groove as wire 27a, and these wires are connected to each other to form a copper-constantan thermocouple in the groove 51.

Constantan wire 54a extends from the groove 50 and is connected to a copper wire 54b which is inserted into the next adjacent pair of grooves 50 and 51. The next adjacent pair of grooves also contains a constantan wire 54a which leads outwardly of the pair of grooves and is also connected to another copper wire 54b. Thus, each pair of grooves 50 and 51 contain a pair of constantan or copper wires 54a and 54b which are connected together in grooves 51 to form a copper-constantan thermocouple, the wires being connected to each other so that the thermocouples are connected in series around the support ring 44. The copper wire 27b leads from the last hole 55, both wires 27a and 27b being connected to the electrical connector 23.

To provide a cold junction for the serially connected thermocouples, the platform portion 16 of the base 14 is constructed with a series of ports 55 and the ends of the wires opposite the grooves 50 and 51 are connected together and inserted into these ports and a potting compound is inserted around the wires in the ports to insure that the wires are electrically insulated from the cold block consisting of the enlarged support portion 15 of the brass base 14.

The calorimeter bomb 12 is positioned on the support ring 44 as shown in FIGS. 1–3. As is best shown in FIG. 3, the bomb 12 comprises a lower portion 60 and an upper portion 61. The upper portion 61 has male threads 62 that are received in the female threads 63 of the lower portion 60. The upper portion 61 has a substantially hemispherical inner surface 65 that terminates in an annular "knife" edge 66, while the lower portion 60 has a substantially hemispherical inner surface 68 that terminates in the annular groove 69. A washer 70 is disposed about the male threads 62 of the upper portion 61 of the bomb and the lower portion 60 is attached to the upper portion 61 by rotating the upper and lower portions with respect to each other so that the threads 62 and 63 engage each other. When the upper and lower portions are attached to each other in this manner, the washer 70 is compressed between the surfaces 71 and 72 which define annular grooves 73 and 74, respectively. As the washer 70 is compressed by the surfaces 71 and 72, it tends to extend into the grooves 73 and 74 to form an effective seal between the upper and lower portions of the bomb 12. When the bomb is assembled in this manner, the interior hemispherical surfaces 65 and 68 form a substantially spherical enclosure.

The upper portion 61 of the calorimeter bomb 12 defines a bore 75 positioned in such a manner so as to support the stainless steel sample platform or pan support 76 of FIG. 4. The sample platform 76 comprises a support shaft 78, the upper end of which is adapted to be inserted into the bore 75 of the upper portions 61 of the bomb, and the lower portion of which is adapted to support the lower platform 79. The lower platform 79 is attached to the lower portion of the shaft 78 by spot-welding or other convenient means, and an upper platform 80 supported by an extension piece 81 from the support shaft 78 is disposed directly above the lower platform 79. The sample platform 76 is supported from the upper portion 61 of the calorimeter bomb so that the platforms 79 and 80 will be supported centrally of the hemispherical area defined by the bomb.

Referring now to FIGS. 3 and 6, the upper portion 61 of the bomb 12 has a flange 84 extending upwardly therefrom. The upper portion 61 has a central bore 85 extending therethrough, the bore 85 being counterbored at 86 in the vicinity of the flange 84. The counterbore 86 is threaded and receives a one-way check valve assembly 88 therein. The check valve assembly 88 has a housing 89 that is externally threaded along its length at 90 and defines an interiorly threaded bore 91. The bore 91 terminates at the lower end of the housing 89 in a smaller bore 92 which presents an inwardly facing surface 93 around the bore 92. The upper end of the housing 89 in a smaller bore 92 which presents an inwardly facing surface 93 around the bore 92. The upper end of the housing 89 is formed with several flattened surfaces 94 so that the housing can be threaded into the counterbore 86 of the upper portion 61 of the calorimeter bomb.

A spring 95 is inserted into the bore 91 against the surface 93 of the housing 89 and a ball 96 is positioned above the spring 95. A valve seat assembly 98 is threadably received in the threads of the bore 91 of the housing 89, and comprises a stop 99 centrally apertured at 100 and a valve seat 101. The valve seat 101 is formed of a substance, such as Teflon, that offers a relatively soft and sealing surface to the ball 96 of the check valve assembly. Of course, the valve seat 101 is centrally apertured and is generally an extension of the stop 99.

A washer 105 of a suitable sealing material, such as Teflon, or the like, is positioned in the counterbore 86 of the upper portion 61 of the bomb so that when the check valve assembly 88 is threadably received in the counterbore 86, the washer 105 will be compressed to effectively seal the check valve assembly 88 to the upper portion 61 of the bomb.

With this construction, it can be seen that when a suitable hose connection 106 of conventional design is connected to the check valve assembly so that a source of pressure communicates with the check valve assembly, the ball 96 of the check valve assembly will move away from its seat 101 against the bias of spring 95 so that the pressurizing fluid will pass through the port 100, around the ball 96, and through the bore 92 of the check valve assembly, and through the bore 85 of the upper portion 61 of the bomb, into the spherical interior portion of the bomb.

Referring now to FIGS. 3 and 5, the upper portion 61 of the bomb 12 defines a bore 108 disposed at an angle with the bore 85. The bore 108 is counterbored at 109 from the interior surface 65 of the bomb. An electrode assembly 110 is adapted to be inserted through the bore 108 and its counterbore 109. The electrode assembly 110 comprises a sleeve 111 composed of a nonconducting material. The sleeve 111 comprises an elongate portion 112 and defines an aperture 114 centrally thereof. One end of the sleeve 111 has a flange 115 disposed thereabout, and the aperture 114 is tapered at 116 in the vicinity of the flange 115. The flanged portion 115 of the sleeve 111 is of a size approximately equal to the counterbore 109 of the bore 108, and the elongate portion 112 of the sleeve is of a diameter approximately equal to the bore 108. With this construction, it can be seen that the sleeve 111 can be slipped into the bore 108 and the counterbore 109 from the interior portion of the bomb 12 and the flange 115 of the sleeve will rest against the shoulder between the bore 108 and the counterbore 109 of the bomb.

A threaded screw 118 is inserted through the aperture 114 of the sleeve 111. The screw 118 has a head 119 that is tapered outwardly from the body of the screw. The angle of the taper of the head 119 of the screw 118 is substantially the same as the angle of the tapered portion 116 of the aperture 114. Of course, when the screw is inserted through the aperture 114, its head 119 will abut the tapered portion 116 of the aperture 114. When the screw is inserted through the aperture 114 of the sleeve 111 in this manner, its end 120 remote from its head 119 will extend outwardly of the upper portion 61 of the bomb, and a washer 121, composed of a non-conducting substance similar to that of sleeve 111, is inserted over the end 120 of the screw and a nut 122 is threaded over the threads of the screw. When the nut 122 is tightly fastened to the screw in this manner, the head 119 of the screw will compress the flange 115 of the sleeve 111 against the shoulder between the bore 108 and its counterbore 109 of the bomb so that a fluid tight seal is maintained at this point. Of course, the washer 121 insulates the nut 122 from the surface of the upper portion 61 of the bomb so that the metallic portion of the electrode assembly 110 does not contact any part of the upper portion 61 of the bomb.

A platinum wire 125 is attached to the head 119 of the screw, as by soldering or other conventional means, so that it extends down toward the central portion of the spherical area defined by the bomb, in the vicinity of the lower platform 79 of the sample platform 76. An electrical conductor 26a is attached to the end 120 of the screw 118 in a conventional manner. As is shown in FIG. 2, the electrical conductor 26a extends downwardly from the end 120 of the screw 118, through the aperture 24 of the receptacle 18 and is connected to the electrical connector 22.

The flange 84 of the upper portion 61 of the bomb defines a blind bore 130 to which is attached the electrical conductor 26b. The electrical conductor 26b extends downwardly from the blind bore 130, through the aperture 24 of the receptacle 18 and is connected to the electrical connector 22. The electrical conductor 26a will be connected to a positive charge of direct current while the conductor 26b will be connected to a negative charge.

Figure 7:
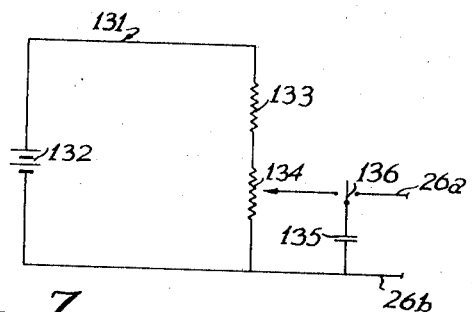
FIG. 7 is a schematic view of the electrical ignition circuit of the calorimeter bomb.

As is shown in FIG. 7, the electrical conductors 26a and 26b are connected to a firing circuit 131. The firing circuit comprises a source 132 of direct current, a first resistance 133, and a second variable resistance 134 connected in series. A capacitor 135 is connected to the resistor 134 so that the charge received by the capacitor can be varied. A two-way switch 136 connects the capacitor 135 alternately to the source 132 and to the conductor 26a. With this arrangement, it can be seen that when the two-way switch connects the capacitor 135 to the source of voltage 132, the capacitor 135 is charged with electricity, the amount being determined by the resistances 133 and 134. When the two-way switch 136 is reversed so as to connect the capacitor 135 to the conductor 26a, it will be seen that the capacitor will charge the conductor 26a.

*Operation*

Since benzoic acid of 99.97% purity has a known calorific value of 6324 calories per gram, it can be utilized to test the general performance of the bomb and calibrate the recording equipment utilized therewith. Pelleted samples weighing one to twenty grams can be utilized to calibrate the calorimeter and its recording potentiometer. A quantity of benzoic acid of known weight on a crucible of known weight are placed on the sample platform 76. A platinum wire (0.006 in. in diameter) joining electrode 125 with the stainless steel pan support 76 is positioned on top of the benzoic acid so as to just touch the surface of the acid. The upper portion 61 and lower portion 60 of the bomb 12 are then partially screwed together so that they are attached to each other but do not yet form a fluid tight seal with each other. A source of oxygen is connected to the upper portion 61 of the bomb through the check valve assembly 88 and the interior portion of the bomb flushed with oxygen; the fluid inside the bomb escaping from the bomb through the imperfect seal between the upper and lower portions thereof. After the bomb has been flushed in this manner, the upper and lower portions 61 and 60 are tightened together so that the Teflon washer 70 forms a seal between the surfaces 71 and 72 of the lower and upper portions of the bomb. At this point, the interior portion of the bomb is charged with a predetermined pressure of oxygen, usually thirty atmospheres, and then the connecting hose of the source of oxygen pressure removed from the check valve assembly 88. Of course, when the source of pressure is removed from the check valve assembly, the ball 96 of the check valve is forced against its seat 101 so that the pressure in the interior portion of the bomb 12 is maintained.

The bomb 12 is then placed on the support ring 44 of the stand 11. The bomb is placed on the support ring in such a manner that a firm contact is made between the lower portion of the bomb and the conducting ring 48 (FIG. 3) so that the heat emitted from the bomb will be transferred to the ring. The electrical conductors 26a, 26b, 27a, and 27b are then connected as shown in FIG. 2, and an insulating cover of standard design placed over the major portion of the calorimeter so that it rests on the support portion 15 of the base 14 of the stand. A recording potentiometer is then connected to the electrical conductors 27a and 27b through the electrical connector 23 and a period of time is allowed to pass so that the recording potentiometer will have enough time to give a constant reading.

When the potentiometer has given a constant reading for a short period of time, indicating that the bomb and the thermocouples disposed about the heat conducting ring 48 (FIG. 3) have reached an equal temperature, the two-way switch 136 (FIG. 7) of the firing circuit 131 is moved from its capacitor charging position (from the left as shown in FIG. 7) to its capacitor discharging position (to the right as shown in FIG. 7) so that the electrical conductor 26a is charged with electricity. This, of course, heats the platinum wire attached to the electrode 125 so that the benzoic acid is ignited. When the benzoic acid is ignited in this manner, it will burn and heat the bomb. The heat transmitted from the bomb to the heat conducting ring 48 will raise the temperature of the thermocouple junctions disposed about the ring. Since the thermocouple junctions in the holes 55 do not change in temperature, an electrical current is produced and the recording potentiometer will change its indication, which indicates the heat given off by the benzoic acid. Since the thermocouples are connected to each other in series about the ring 48, it can be seen that if the bomb 12 is heated unevenly, that is if one side of the bomb is heated to a higher degree than another side, a thermocouple will be in the vicinity of the hotter portion and will be affected to a higher degree than a thermocouple located at a portion not heated as high. This arrangement assures that the reading of the thermocouples is cumulative, regardless of the distribution of the heat about the bomb 12 so that the total amount of heat emitted from the ignition of the sample will be recorded.

Since benzoic acid gives off a predetermined amount of heat per unit of weight, the calorimeter and its recording potentiometer can be calibrated and other substances of unknown heat quantities can be tested so as to determine their heat properties. Of course, the procedure in testing other substances is similar to that followed in calibrating the calorimeter and its recording apparatus with beznoic acid. Of course, when calibrating other substances and when igniting benzoic acid, there will be a residue left in the calorimeter after the test is complete. This residue should be taken into account in determining the properties of the material tested. Also, the temperature rise of the bomb extends over a period of time which should be taken into consideration, and a correction should be entered for the heat input to the electrode wire, which should be the same for each test.

We claim:

1. Apparatus for measuring heat emitted from a substance comprising a structure defining an enclosed space adapted to withstand superatmospheric pressure, valve means for injecting gas into said space, said valve means being a one-way check valve, means for igniting said substance, an annular supporting means for supporting said structure, temperature responsive means disposed at various points about said annular supporting means and in contract with the exterior of said structure, and means for electrically connecting said temperature responsive means in series with each other whereby the amount of electricity produced by said temperature responsive means will reflect the mean temperature of said temperature responsive means.

2. Apparatus for measuring heat emitted from a substance as claimed in claim 1 wherein said means for igniting said substance comprises a non-conductive sleeve having an outwardly extending flange at one end and defining a passageway therethrough with an outwardly tapered portion disposed interiorly of said flange, an electrically conductive shaft extending through said passageway, said shaft having a head portion complementary to the outwardly tapered portion of said passageway, a platinum electrode extending from said head portion of said shaft toward the enclosed space of said structure, and means for imparting an instantaneous electrical charge to said electrode.

3. A method of detecting the amount of heat generated from a burning substance comprising confining a substance in a closed area of a structure, flushing the area, sealing the area from the atmosphere, injecting oxygen under pressure into said area, igniting said substance, measuring the temperature of various points on the structure, and averaging the measurements thus taken to indicate the mean temperature of the structure.

4. The method of detecting the amount of heat generated from a burning substance as claimed in claim 3 wherein the closed area of said structure is flushed by injecting oxygen thorugh an opening at one point of said closed area and removing the gases within said closed area through an opening extending around said closed area.

References Cited

UNITED STATES PATENTS

| | | | |
|---|---|---|---|
| 1,563,662 | 12/1925 | Scholes | 73—191 |
| 1,708,873 | 4/1929 | Darroch | 73—191 |
| 2,065,870 | 12/1936 | Parr | 73—191 |
| 3,273,968 | 9/1966 | Benzinger | 73—190 |

RICHARD C. QUEISSER, *Primary Examiner.*

JERRY W. MYRACLE, *Assistant Examiner.*

U.S. Cl. X.R.

73—341